United States Patent

Oshiro et al.

(10) Patent No.: US 6,831,553 B2
(45) Date of Patent: Dec. 14, 2004

(54) METHOD AND APPARATUS FOR DETECTING DECREASE IN TIRE AIR-PRESSURE AND PROGRAM FOR JUDGING DECOMPRESSION OF TIRE

(75) Inventors: Yuji Oshiro, Kobe (JP); Minao Yanase, Kobe (JP)

(73) Assignees: Sumitomo Rubber Industries, Ltd., Kobe (JP); Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 10/280,060

(22) Filed: Oct. 25, 2002

(65) Prior Publication Data

US 2003/0080863 A1 May 1, 2003

(30) Foreign Application Priority Data

Oct. 25, 2001 (JP) ........................................ 2001-327868
Nov. 29, 2001 (JP) ........................................ 2001-365049

(51) Int. Cl.$^7$ ............................................. B60C 23/00
(52) U.S. Cl. ................... 340/442; 73/146.4; 73/146.5; 340/444
(58) Field of Search .......................... 340/442; 73/146.3, 73/146.4, 146.5

(56) References Cited

U.S. PATENT DOCUMENTS 5,345,217 A * 9/1994 Prottey ........................ 340/442
5,940,781 A * 8/1999 Nakajima .................... 702/98

FOREIGN PATENT DOCUMENTS

| EP | 0489563 A1 | * | 6/1992 | ........... B60C/23/00 |
| EP | 0 489 563 A1 | | 10/1992 | ........... B60C/23/00 |
| EP | 0 650 856 A1 | | 3/1995 | ........... B60C/23/06 |
| EP | 0 724 974 A1 | | 7/1996 | ........... B60C/23/06 |
| JP | 5-213019 A | | 8/1993 | ........... B60C/23/06 |
| JP | 7-47820 A | | 2/1995 | ........... B60C/23/06 |
| JP | 7-47821 A | | 2/1995 | ........... B60C/23/06 |
| JP | 7-52621 A | | 2/1995 | ........... B60C/23/06 |
| JP | 8-268014 A | | 10/1996 | ........... B60C/23/06 |

* cited by examiner

*Primary Examiner*—Jeffery Hofsass
*Assistant Examiner*—Jennifer Stone
(74) *Attorney, Agent, or Firm*—Birch, Stewart, Kolasch & Birch, LLP

(57) ABSTRACT

A method for detecting decrease in tire air-pressure in which decrease in internal pressure of a tire is detected on the basis of rotational information. The method includes the steps of: detecting rotational information of the tires; storing the rotational information; comparing rotational information of all left-sided wheels and rotational information of all right-sided wheels of the vehicle when the vehicle is performing straight-ahead running; and judging decompression on the basis of a relationship between a value obtained through comparison of the left-sided and right-sided rotational information and a specified threshold. It is possible to detect decompression of a single wheel tire while it is also possible to detect that two wheel tires on the left or right are simultaneously decreased.

13 Claims, 7 Drawing Sheets

METHOD AND APPARATUS FOR DETECTING DECREASE IN TIRE AIR-PRESSURE AND PROGRAM FOR JUDGING DECOMPRESSION OF TIRE

This nonprovisional application claims priority under 35 U.S.C. §119(a) on Patent Application No. 2001-365049 and 2001-327868 filed in JAPAN on Nov. 29, 2001 and Oct. 25, 2001, respectively, which is herein incorporated by reference.

BACKGROUND OF THE INVENTION

The present invention relates to a method and apparatus for detecting decrease in tire air-pressure and a program for judging decompression of a tire. More particularly, it relates to a method and apparatus for detecting decrease in tire air-pressure and a program for judging decompression of a tire with which it is possible to detect simultaneous decompression of two wheel tires on the same side of a four-wheeled vehicle or simultaneous decompression of both front tires or both rear tires while it is further possible to detect decompression of a single wheel tire.

An apparatus for detecting decrease in tire air-pressure (DWS) in which decompression of a tire is detected on the basis of rotational (wheel speed) information of four wheel tires attached to a vehicle is conventionally known. The apparatus employs a theory that a rotational velocity or a rotational angular velocity of a compressed tire is increased when compared to remaining normal tires owing to a decrease in outer diameter (dynamic load radius of the tire) from that of a tire of normal internal pressure. In a method for detecting decrease in internal pressure on the basis of a relative difference in rotational angular velocities of tires (reference should be made to Japanese Unexamined Patent Publication No. 305011/1988), $$DEL=\{(F1+F4)/2-(F2+F3)/2\}/\{(F1+F2+F3+F4)/4\}\times 100(\%)$$

is employed as a judged value DEL. Here, F1 to F4 denote rotational angular velocities of a front left tire, a front right tire, a rear left tire and a rear right tire, respectively.

However, since decompression is judged on the basis of a difference in sums of rotational angular velocities of the four wheels which are respectively located diagonally with respect to each other, it is impossible to detect simultaneous decompression of all left-sided wheels or all right-sided wheels (two wheel tires on the same side). It is further impossible to detect simultaneous decompression of both front wheels or both rear wheels. Therefore, there exists a danger that fuel consumption is worsened through increase in rolling resistance of the tire and that a burst might be caused upon continuing running without being aware of decompression.

SUMMARY OF THE INVENTION

In view of the above facts, it is an object of the present invention to provide a method and apparatus for detecting decrease in tire air-pressure and a program for judging decompression of a tire with which it is possible to detect simultaneous decompression of two wheel tires on the same side of a four-wheeled vehicle or simultaneous decompression of both front tires or both rear tires while it is further possible to detect decompression of a single wheel tire.

In accordance with a first aspect of the present invention, there is provided a method for detecting decrease in tire air-pressure in which decrease in internal pressure of a tire is detected on the basis of rotational information obtained from tires attached to a vehicle. The method includes the steps of: detecting rotational information of the respective tires; storing the rotational information of the respective tires; comparing rotational information of all left-sided wheels and rotational information of all right-sided wheels of the vehicle when the vehicle is performing straight-ahead running; and judging decompression on the basis of a relationship between a value obtained through comparison of the left-sided and right-sided rotational information and a specified threshold.

In accordance with a second aspect of the present invention, there is provided an apparatus for detecting decrease in tire air-pressure in which decrease in internal pressure of a tire is detected on the basis of rotational information obtained from tires attached to a vehicle. The apparatus includes: rotational information detecting means for detecting rotational information of the respective tires; a rotational information storing means for storing the rotational information of the respective tires; a comparing means for comparing rotational information of all left-sided wheels and rotational information of all right-sided wheels of the vehicle when the vehicle is performing straight-ahead running; and a decompression judging means for judging decompression on the basis of a relationship between a value obtained through comparison of the left-sided and right-sided rotational information and a specified threshold.

In accordance with a third aspect of the present invention, there is provided a program for judging decompression of a tire, in which for judging decrease in tire air-pressure of a tire, a computer is made to function as a rotational information storing means for storing the rotational information of the respective tires; a comparing means for comparing rotational information of all left-sided wheels and rotational information of all right-sided wheels of the vehicle when the vehicle is performing straight-ahead running; and a decompression judging means for judging decompression on the basis of a relationship between a value obtained through comparison of the left-sided and right-sided rotational information and a specified threshold.

In accordance with a fourth aspect of the present invention, there is provided a method for detecting decrease in tire air-pressure in which decrease in internal pressure of a tire is detected on the basis of rotational information obtained from tires attached to a vehicle. The method includes the steps of: detecting rotational information of the respective tires; storing the rotational information of the respective tires; comparing rotational information of both front wheels and rotational information of both rear wheels of the vehicle when the vehicle is performing straight-ahead running and neither driving nor braking force is acting on the tires; and judging simultaneous decompression of both front wheels or simultaneous decompression of both rear wheels on the basis of a relationship between a value obtained through comparison of the rotational information of both front wheels and the rotational information of both rear wheels and a specified threshold.

In accordance with a fifth aspect of the present invention, there is provided an apparatus for detecting decrease in tire air-pressure in which decrease in internal pressure of a tire is detected on the basis of rotational information obtained from tires attached to a vehicle. The apparatus includes: rotational information detecting means for detecting rotational information of the respective tires; a rotational information storing means for storing the rotational information of the respective tires; a comparing means for comparing rotational information of both front wheels and rotational information of both rear wheels of the vehicle when the vehicle is performing straight-ahead running and neither driving nor braking force is acting on the tires; and a decompression judging means for judging simultaneous decompression of both front wheels or simultaneous decompression of both rear wheels on the basis of a relationship between a value obtained through comparison of the rotational information of both front wheels and the rotational information of both rear wheels and a specified threshold.

In accordance with a six aspect of the present invention, there is provided a program for judging decompression of a tire, in which for judging decrease in tire air-pressure of a tire, a computer is made to function as a rotational information storing means for storing the rotational information of the respective tires; a comparing means for comparing rotational information of both front wheels and rotational information of both rear wheels of the vehicle when the vehicle is performing straight-ahead running and neither driving nor braking force is acting on the tires; and a decompression judging means for judging simultaneous decompression of both front wheels or simultaneous decompression of both rear wheels on the basis of a relationship between a value obtained through comparison of the rotational information of both front wheels and the rotational information of both rear wheels and a specified threshold.

DETAILED DESCRIPTION

A method and apparatus for detecting decrease in tire air-pressure and a program for judging decompression of a tire according to the present invention will now be explained on the basis of the accompanying drawings.

Embodiment 1

Figure 1:
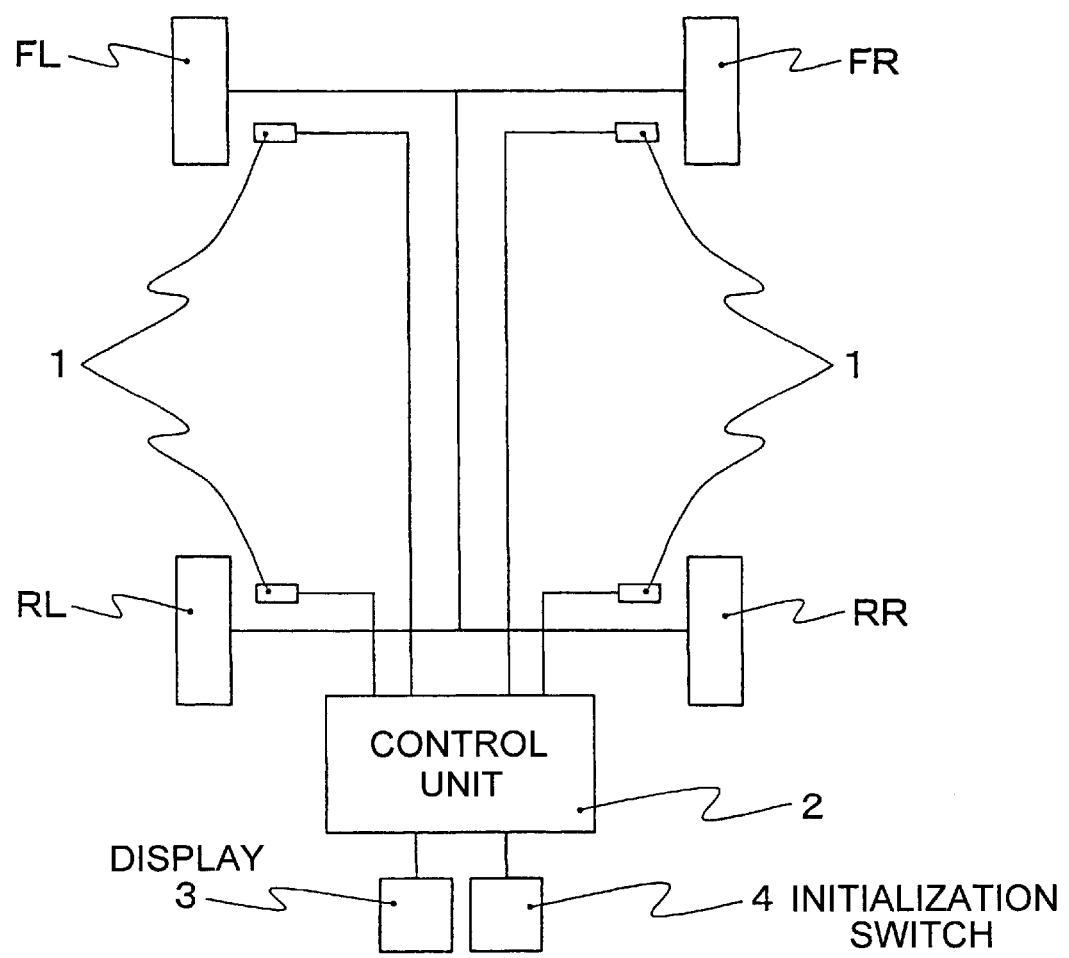
FIG. 1 is a block view showing Embodiment 1 of the apparatus for detecting decrease in tire air-pressure according to the present invention.

As shown in FIG. 1, the apparatus for detecting decrease in tire air-pressure according to Embodiment 1 of the present invention is for detecting whether air-pressure of any of four tires FL, FR, RL and RR (hereinafter referred to as Wi in general, wherein i=1 to 4, 1: front left tire, 2: front right tire, 3: rear left tire, 4: rear right tire) provided in a four-wheeled vehicle has decreased or not, and includes ordinary rotational information detecting means 1 respectively provided for each of the tires Wi.

The rotational information detecting means 1 might be a wheel speed sensor for measuring a wheel speed (rotational velocity) on the basis of number of pulses upon generating rotational pulses by using an electromagnetic pickup or similar or an angular velocity sensor in which power is generated through rotation such as in a dynamo, wherein the wheel speeds are measured from a voltage thereof. Outputs of the rotational information detecting means 1 are supplied to a control unit 2 which might be a computer such as an ABS. A display 3 comprising liquid crystal elements, plasma display elements or CRT for informing a tire Wi of which the tire air-pressure has decreased and an initializing switch 4 which might be operated by a driver are connected to the control unit 2.

Figure 2:
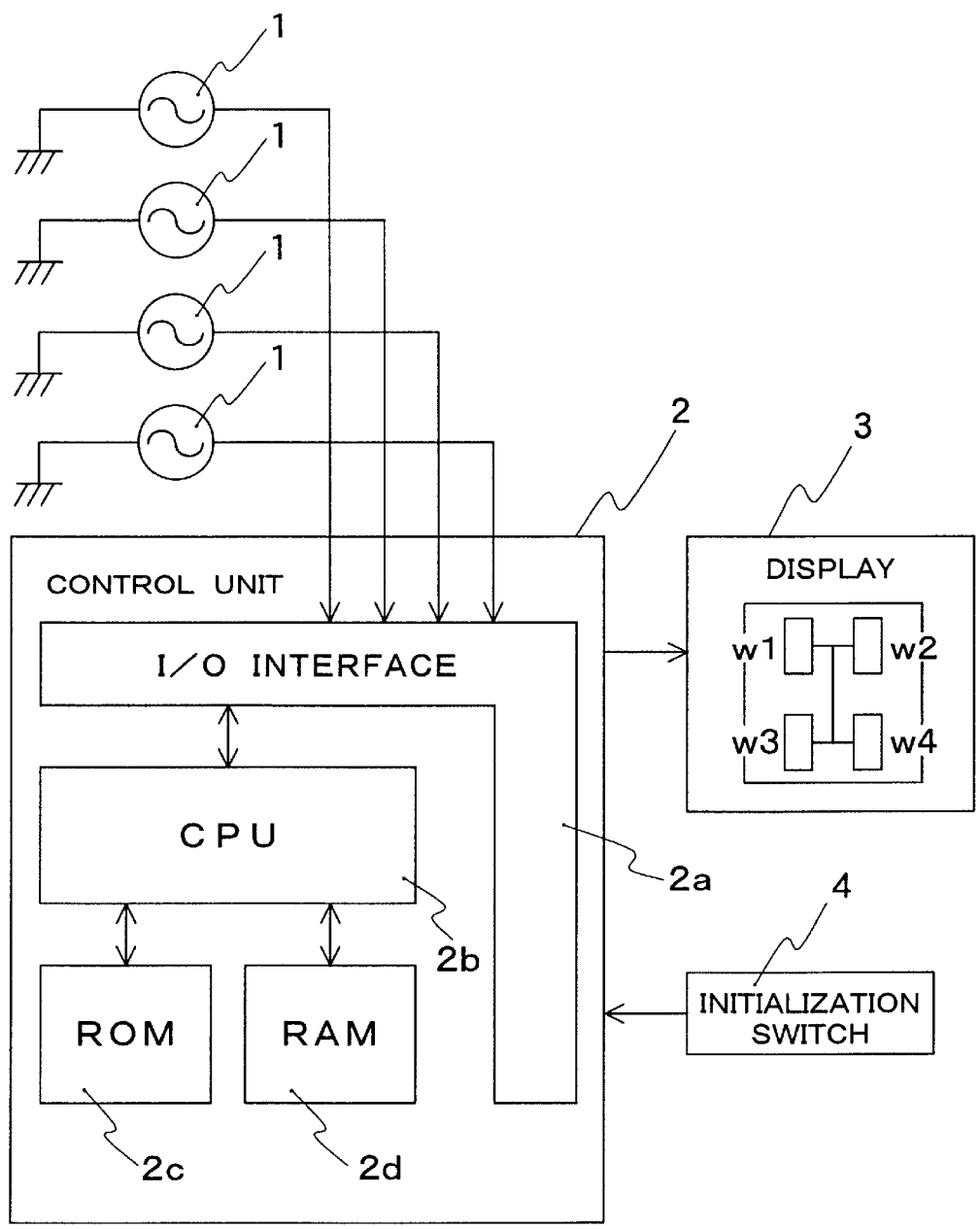
FIG. 2 is a block view showing electric arrangements of the apparatus for detecting decrease in tire air-pressure of FIG. 1.

As shown in FIG. 2, the control unit 2 comprises an I/O interface 2a required for sending/receiving signals to/from an external device, a CPU 2b which functions as a center of calculation, a ROM 2c which stores therein a control operation program for the CPU 2b, and a RAM 2d into which data are temporally written and are read out therefrom when the CPU 2b performs control operations.

Pulse signals corresponding to the rotational number of tires Wi (hereinafter referred to as "wheel speed pulses") are output from the rotational information detecting means 1. In the CPU 2b, rotational angular velocities F1 for respective tires Wi are calculated on the basis of the wheel speed pulses as output from the rotational information detecting means 1 at specified sampling periods $\Delta T(sec)$, for instance, $\Delta T=1$ second.

Since the tires Wi are manufactured to include variations (initial differences) within standards, effective rolling radii of the respective tires Wi (a value obtained by dividing a distance that has been traveled by a single rotation by $2\pi$) are not necessarily identical even though all of the tires Wi are at normal internal pressure. This will result in variations in the rotational angular velocities F1 of the respective tires Wi. Thus, corrected rotational angular velocities $F1_i$ to cancel variations owing to initial differences are calculated. More particularly, corrections are performed to satisfy $F1_1=F_1$
$F1_2=mF_2$
$F1_3=F_3$
$F1_4=nF_4$.

The correction coefficients m and n are obtained as $m=F_1/F_2$ and $n=F_3/F_4$ on the basis of rotational angular velocities $F_i$ when the rotational angular velocities $F_i$ have been calculated on the premise that the vehicle is performing straight-ahead driving. Then, wheel speeds Vi of the respective tires are calculated on the basis of $F1_i$.

In Embodiment 1, it is possible to judge decompression of a single wheel tire from among four wheel tires as well as to judge simultaneous decompression of both left-sided or right-sided wheel tires in order to improve accuracy of judging decompression. For instance, in case the threshold for judging decompression is set to be a threshold for judging simultaneous decompression of 30% of both left-sided or right-sided wheel tires, it is possible to judge decompression of a single tire by 60%.

The apparatus of Embodiment 1 includes a rotational information detecting means 1 for detecting rotational information of respective tires Wi, a rotational information storing means for storing the rotational information of the respective tires Wi; a comparing means for comparing rotational information of all left-sided wheels and rotational information of all right-sided wheels of the vehicle when the vehicle is performing straight-ahead running; and a decompression judging means for judging decompression on the basis of a relationship between a value obtained through comparison of the left-sided and right-sided rotational information and a specified threshold.

It should be noted that the value obtained through comparison might be a difference besides an amount of fluctuation in ratios. Embodiment 1 will be explained on the basis of a case in which the value obtained through comparison is an amount of fluctuation in ratios.

The program for judging decompression of a tire according to Embodiment 1 is so arranged that the control unit 2 is made to function as the rotational information storing means for storing the rotational information of the respective tires Wi; the comparing means for comparing rotational information of all left-sided wheels and rotational information of all right-sided wheels of the vehicle when the vehicle is performing straight-ahead running; and the decompression judging means for judging decompression on the basis of a relationship between a value obtained through comparison of the left-sided and right-sided rotational information and a specified threshold.

Figure 3:
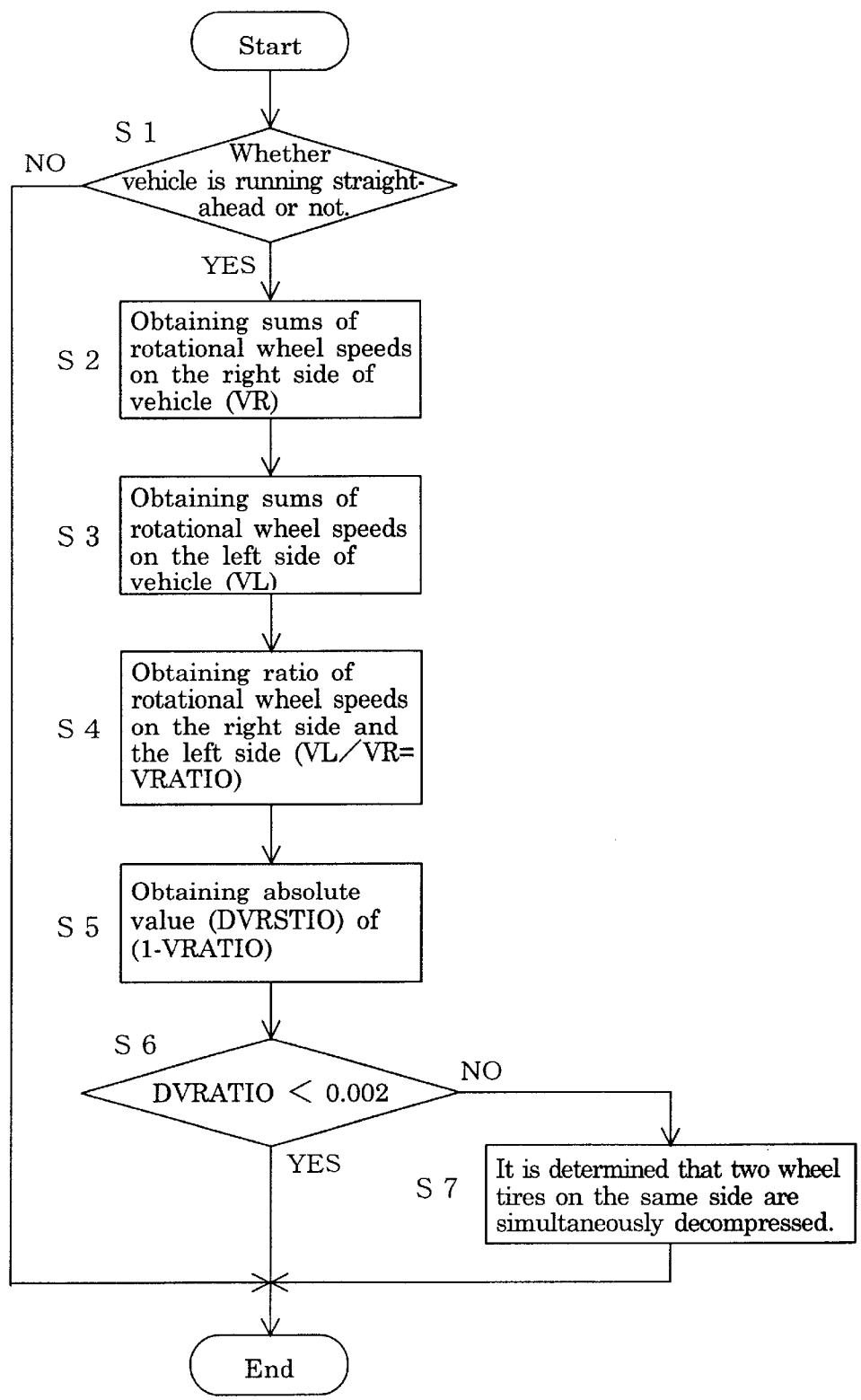
FIG. 3 is one example of a flowchart related to Embodiment 1 of the present invention.

Actions of the apparatus for detecting decrease in tire air-pressure according to Embodiment 1 will now be explained on the basis of FIG. 3.

It is determined whether the vehicle is running straight-ahead or not (Step S1). For performing this determination, it is possible to employ information of a steering angle sensor. When the condition of running straight-ahead is met, sums of respective rotational wheel speeds on the right side and the left side of the vehicle (VR, VL) are respectively obtained (Steps S2, S3). Then, a ratio of rotational wheel speeds on the right side and the left side (VL/VR) is obtained (Step S4). Defining this ratio as VRATIO, the VRATIO will ordinarily approximate to 1 when the tires are at normal internal pressure since the rotational information speed on the right side and the rotational information speed on the left side will become substantially identical. In contrast thereto, when a wheel on either side is decompressed, VRATIO will depart from 1. Thus, an absolute value of an amount of fluctuation in the ratio of the rotational wheel speeds with respect to 1 (1−VRATIO) is obtained (Step S5). It is then determined whether the absolute value DVRATIO exceeds a specified threshold, for instance, 0.002 (Step S6), and if the value is not less than 0.002, it is determined that two wheel tires on the same side are simultaneously decompressed (Step S7). It should be noted that the threshold might be set by using data preliminarily obtained through tests in which running was performed in a decompressed state.

While the present invention will now be explained on the basis of examples thereof, the present invention is not to be limited to such examples only.

EXAMPLE 1

A FF (front engine/front drive) vehicle attached with summer tires of normal internal pressure ($2.2 \times 10^5$ Pa) was provided. The tire size of the tires was 185/70R14. A running condition for the vehicle was a condition in which the vehicle was made to run on a straight course at a constant speed (50 km/h) with 2 persons riding thereon.

EXAMPLE 2

The vehicle was made to run at the above running conditions upon decompressing the air-pressure of the front left wheel tire and the rear left wheel tire (both wheel tires on the left side) by 25%, respectively.

Wheel speed ratios of front and rear wheels DLR, wheel speed ratios of right-sided and left-sided wheels DFR (VRATIO) and wheel speed ratios of sums of diagonally located wheels DEL were respectively obtained for Examples 1 and 2. The results are shown in FIGS. 4 and 5.

Figure 4:
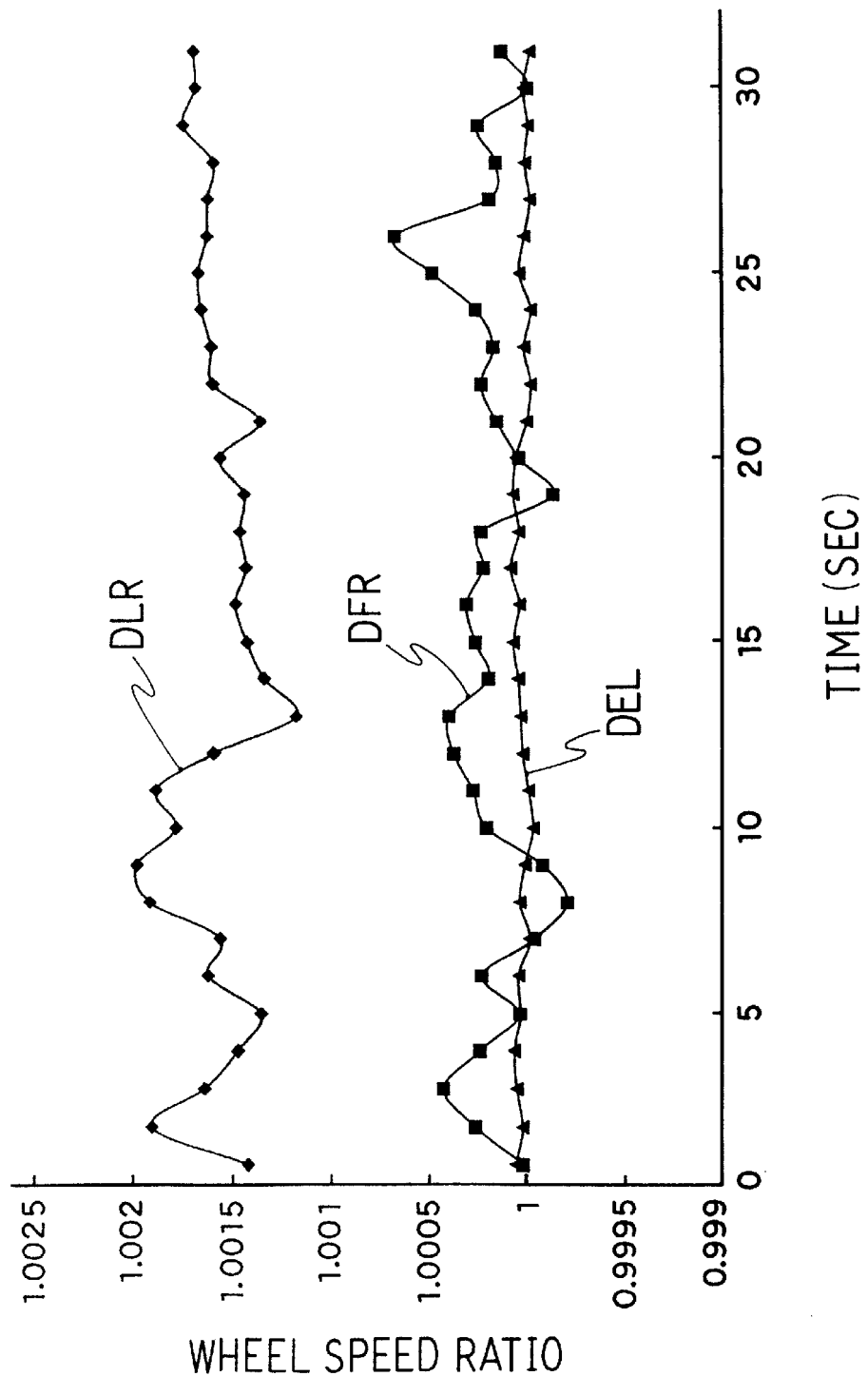
FIG. 4 is a view showing relationships between wheel speed ratios of front and rear wheels DLR, wheel speed ratios of right-sided and left-sided wheels DFR (VRATIO) and wheel speed ratios of sums of diagonally located wheels DEL with respect to time when the tire is of normal internal pressure.
Figure 5:
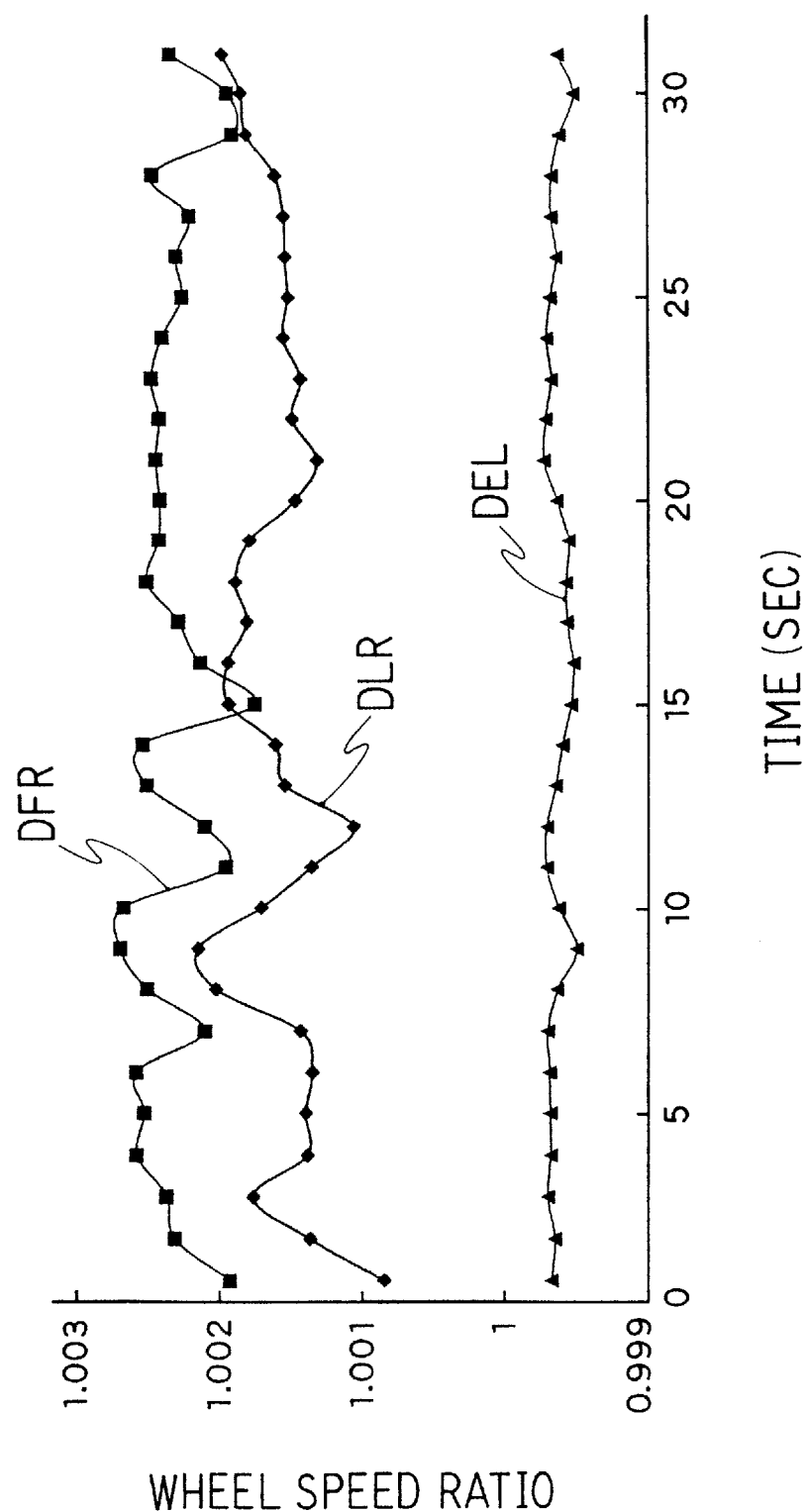
FIG. 5 is a view showing relationships between wheel speed ratios of front and rear wheels DLR, wheel speed ratios of right-sided and left-sided wheels DFR (VRATIO) and wheel speed ratios of sums of diagonally located wheels DEL with respect to time when both wheel tires on the left side are decompressed by 25%.

It can be understood from FIG. 4 that while the wheel speed ratio of the front and rear wheel DLR is larger than 1, the wheel speed ratio DFR (VRATIO) and the wheel speed ratio DEL will be proximate to 1 when the internal pressure is normal. In contrast thereto, it can be understood from FIG. 5 that when both wheel tires on the left side are decompressed by 25%, especially the amount of fluctuation in the wheel speed ratio DFR (VRATIO) will largely exceed 0.002 so that DFR(VRATIO) will become not less than 1.002 in average. It is thus possible to judge simultaneous decompression of two wheel tires on the same side.

Embodiment 2

Embodiment 2 of the present invention will now be explained. Embodiment is so arranged that it is capable of judging decompression of a single wheel tire from among four wheel tires while it is also capable of judging simultaneous decompression of both front wheels or simultaneous decompression of both rear wheels for improving accuracy of judging decompression as same as Embodiment 1. For instance, in case the threshold for judging decompression is set to be a threshold for judging simultaneous decompression of 25% of both front or of both rear wheel tires, it is possible to judge decompression of a single tire by 50%.

The apparatus of Embodiment 2 includes rotational information detecting means 1 for detecting rotational information of respective tires Wi, a rotational information storing means for storing the rotational information of the respective tires Wi; a comparing means for comparing rotational information of both front wheels and rotational information of both rear wheels of the vehicle when the vehicle is performing straight-ahead running and neither driving nor braking force is acting on the tires; and a decompression judging means for judging simultaneous decompression of both front wheels or simultaneous decompression of both rear wheels on the basis of a relationship between a value obtained through comparison of the rotational information of both front wheels and the rotational information of both rear wheels and a specified threshold.

It should be noted that the value obtained through comparison might be a difference besides an amount of fluctuation in ratios. Embodiment 2 will be explained on the basis of a case in which the value obtained through comparison is an amount of fluctuation in ratios.

The program for judging decompression of a tire according to Embodiment 2 is so arranged that the control unit 2 is made to function as the rotational information storing means for storing the rotational information of the respective tires Wi; the comparing means for comparing rotational information of both front wheels and rotational information of both rear wheels of the vehicle when the vehicle is performing straight-ahead running and neither driving nor braking force is acting on the tires; and the decompression judging means for judging simultaneous decompression of both front wheels or simultaneous decompression of both rear wheels on the basis of a relationship between a value obtained through comparison of the rotational information of both front wheels and the rotational information of both rear wheels and a specified threshold.

Figure 6:
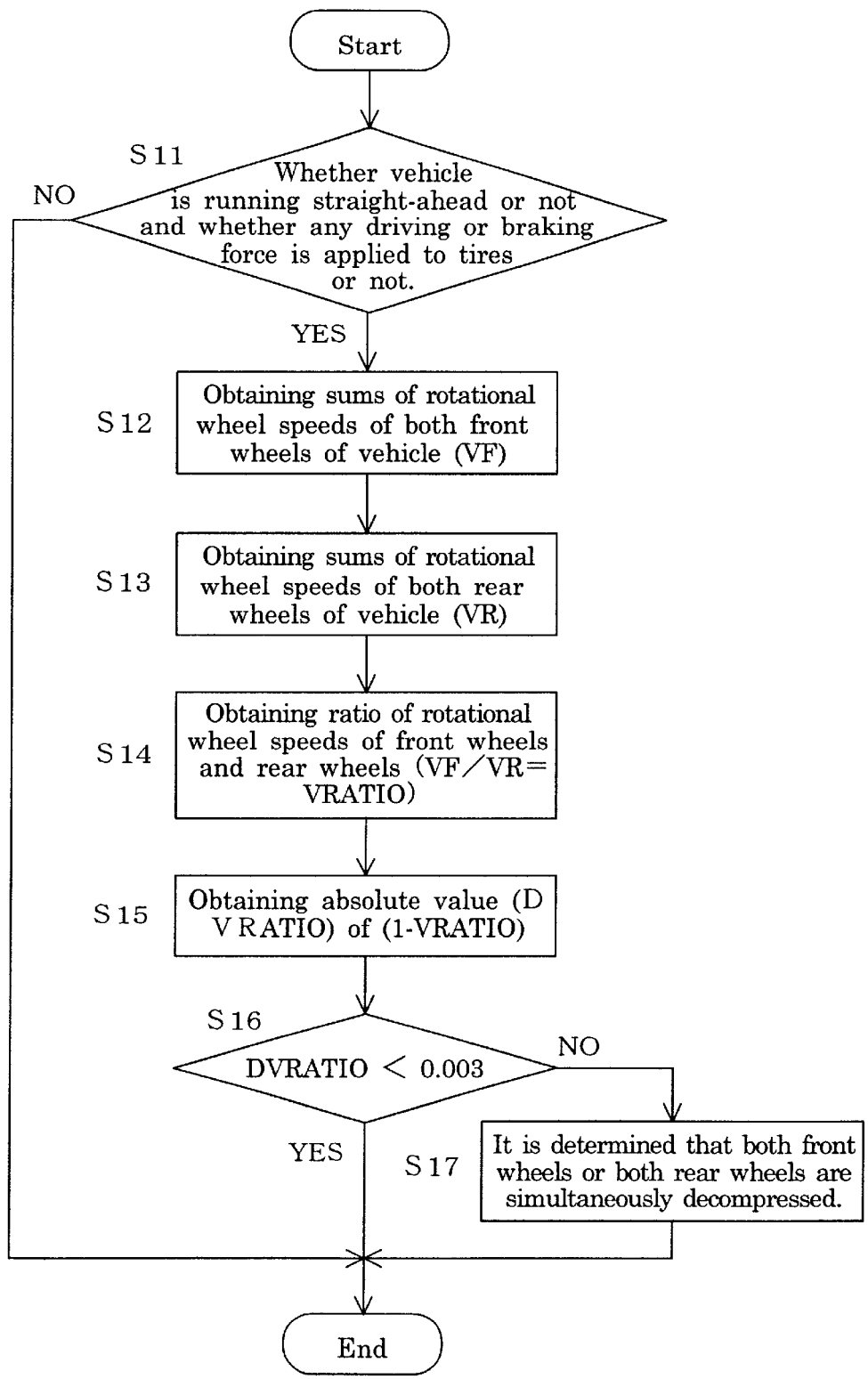
FIG. 6 is one example of a flowchart related to Embodiment 2 of the present invention.

Actions of the apparatus for detecting decrease in tire air-pressure according to Embodiment 2 will now be explained on the basis of FIG. 6.

It is determined whether the vehicle is running straight-ahead or not and whether any driving or braking force is applied to the tires or not (Step S11). For performing this determination, it is determined that the vehicle is driving straight ahead (condition 1) by utilizing information of, for instance, a steering sensor, and that neither driving nor braking force is acting on the tires (condition 2) upon comparing torque information as calculated by an apparatus for controlling running conditions of a vehicle such as an ABS with a preliminarily defined threshold. Then, when both of the conditions 1 and 2 are met, sums of respective rotational wheel speeds of both front wheels and both rear wheels of the vehicle (VF, VR) are respectively obtained (Steps S12, S13). Then, a ratio of rotational wheel speeds of the front wheels and the rear wheels (VF/VR) is obtained (Step S14). Defining this ratio as VRATIO, the VRATIO will ordinarily approximate to 1 when the tires are at normal internal pressure since the rotational information speeds of the front and rear wheels will become substantially identical. In contrast thereto, when two wheels on either side from between the both front wheels and both rear wheels are decompressed, VRATIO will depart from 1. Thus, an absolute value of an amount of fluctuation in the ratio of the rotational wheel speeds with respect to 1 (1−VRATIO) is obtained (Step S15). It is then determined whether the absolute value DVRATIO exceeds a specified threshold, for instance, 0.003 (Step S16), and if the value is not less than 0.003, it is determined that both front wheels or both rear wheels are simultaneously decompressed (Step S17). It should be noted that the threshold might be set by using data preliminarily obtained through tests in which running was performed in a decompressed state.

While the present invention will now be explained on the basis of an example thereof, the present invention is not to be limited to such examples only.

Example 3

The vehicle was made to run under the same conditions as those of Example 1 upon decompressing the air-pressure of both front tires by 25%, respectively.

Figure 7:
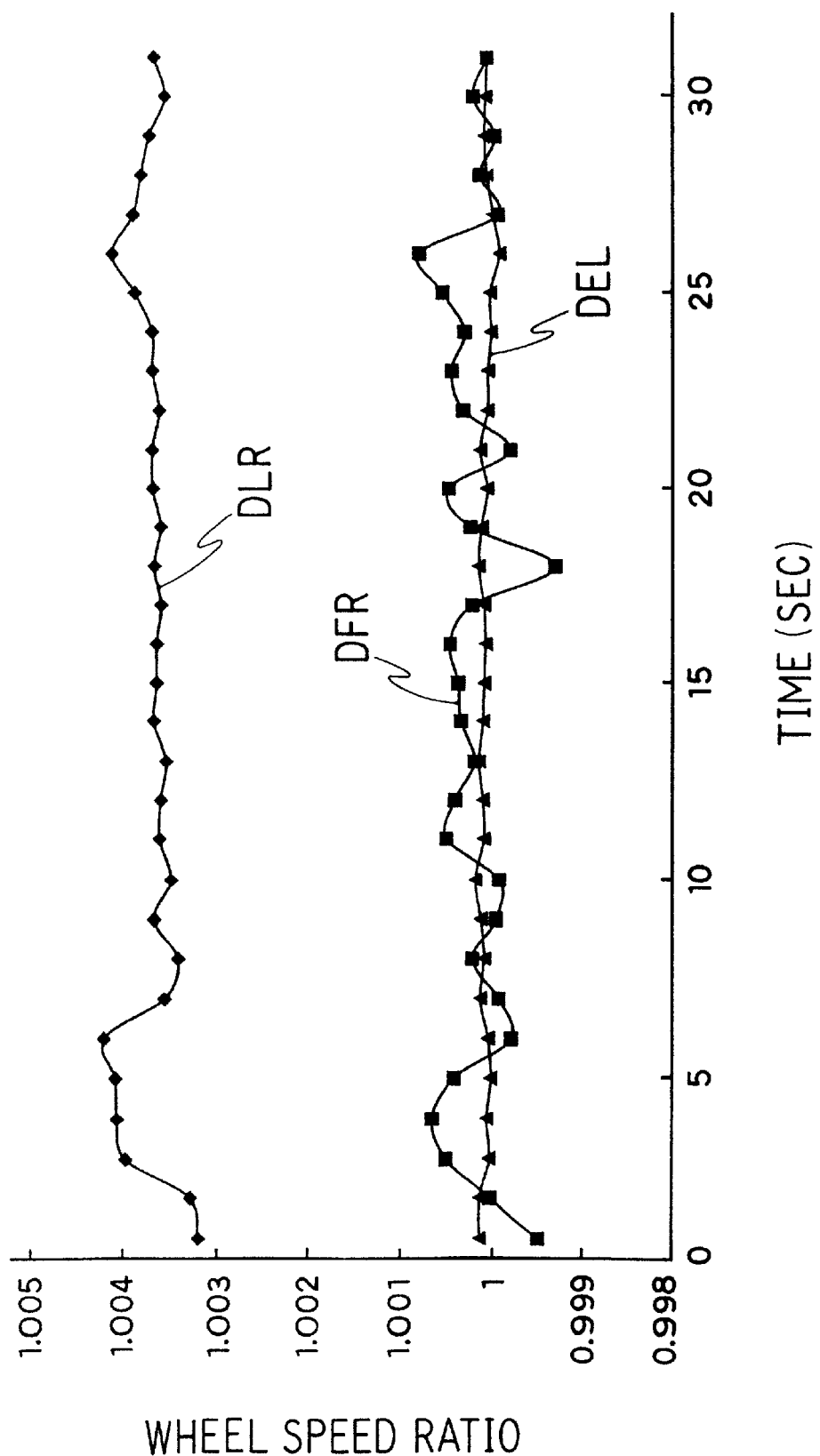
FIG. 7 is a view illustrating relationships between wheel speed ratios of front and rear wheels DLR (VRATIO), wheel speed ratios of right-sided and left-sided wheels DFR and wheel speed ratios of sums of diagonally located wheels DEL with respect to time when both front wheels are decompressed by 25%.

Wheel speed ratios of front and rear wheels DLR (VRATIO), wheel speed ratios of right-sided and left-sided (same-sided) wheels DFR, and wheel speed ratios of sums of diagonally located wheels DEL were respectively obtained for Examples 1 and 3. The results are shown in FIGS. 4 and 7.

As already mentioned, it can be understood from FIG. 4 that while the wheel speed ratios DFR and DEL are proximate to 1, the wheel speed ratio of the front and rear wheels DLR (VRATIO) will be proximate to 1.0015 when the internal pressure is normal. It can also be understood from FIG. 7 that while the wheel speed ratio of same-sided wheels DFR and the wheel speed ratio of sums of diagonally located wheels DEL are hardly changed, the amount of fluctuation in the wheel speed ratio of front and rear wheels DLR (VRATIO) will largely exceed 0.003 so that DLR(VRATIO) will become not less than 1.003 when both front wheels are decompressed by 25%. It is thus possible to judge simultaneous decompression of both front wheel tires.

As explained so far, according to the present invention, it is possible to detect decompression of a single wheel tire while it is also possible to detect that two wheel tires on the left or right are simultaneously decreased when remarkable differences are found upon comparing rotational information of all left-sided wheels with rotational information of all right-sided wheels in order to improve accuracy of judging decompression.

According to the present invention, it is further possible to judge that two wheel tires either in the front or rear are simultaneously decreased when remarkable differences are found upon comparing rotational information (rotational wheel speed) of both front wheels with rotational information (rotational wheel speed) of both rear wheels when the vehicle is running straight-ahead and neither driving nor braking force is acting on the tires.

What is claimed is:

1. A method for detecting decrease in tire air-pressure in which decrease in internal pressure of a tire is detected on the basis of rotational information obtained from tires attached to a vehicle, the method comprising the steps of: detecting rotational information of the respective tires; storing the rotational information of the respective tires; comparing rotational information of all left-sided wheels and rotational information of all right-sided wheels of the vehicle when the vehicle is performing straight-ahead running; and judging decompression on the basis of only a relationship between a value obtained through comparison of the left-sided and right-sided rotational information and a specified threshold.

2. An apparatus for detecting decrease in tire air-pressure in which decrease in internal pressure of a tire is detected on the basis of rotational information obtained from tires attached to a vehicle, the apparatus comprising: rotational information detecting means for detecting rotational information of the respective tires; a rotational information storing means for storing the rotational information of the respective tires; a comparing means for comparing rotational information of all left-sided wheels and rotational information of all right-sided wheels of the vehicle when the vehicle is performing straight-ahead running; and a decompression judging means for judging decompression on the basis of only a relationship between a value obtained through comparison of the left-sided and right-sided rotational information and a specified threshold.

3. A program for judging decompression of a tire, in which for judging decrease in tire air-pressure of a tire, a computer is made to function as a rotational information storing means for storing the rotational information of the respective tires; a comparing means for comparing rotational information of all left-sided wheels and rotational information of all right-sided wheels of the vehicle when the vehicle is performing straight-ahead running; and a decompression judging means for judging decompression on the basis of only a relationship between a value obtained through comparison of the left-sided and right-sided rotational information and a specified threshold.

4. A method for detecting decrease in tire air-pressure in which decrease in internal pressure of a tire is detected on the basis of rotational information obtained from tires attached to a vehicle, the method comprising the steps of: detecting rotational information of the respective tires; storing the rotational information of the respective tires; comparing rotational information of both front wheels and rotational information of both rear wheels of the vehicle when the vehicle is performing straight-ahead running and neither driving nor braking force is acting on the tires; and judging simultaneous decompression of both front wheels or simultaneous decompression of both rear wheels on the basis of only a relationship between a value obtained through comparison of the rotational information of both front wheels and the rotational information of both rear wheels and a specified threshold.

5. An apparatus for detecting decrease in tire air-pressure in which decrease in internal pressure of a tire is detected on the basis of rotational information obtained from tires attached to a vehicle, the apparatus comprising: rotational information detecting means for detecting rotational information of the respective tires; a rotational information storing means for storing the rotational information of the respective tires; a comparing means for comparing rotational information of both front wheels and rotational information of both rear wheels of the vehicle when the vehicle is performing straight-ahead running and neither driving nor braking force is acting on the tires; and a decompression judging means for judging simultaneous decompression of both front wheels or simultaneous decompression of both rear wheels on the basis of only a relationship between a value obtained through comparison of the rotational information of both front wheels and the rotational information of both rear wheels and a specified threshold.

6. A program for judging decompression of a tire, in which for judging decrease in tire air-pressure of a tire, a computer is made to function as a rotational information storing means for storing the rotational information of the respective tires; a comparing means for comparing rotational information of both front wheels and rotational information of both rear wheels of the vehicle when the vehicle is performing straight-ahead running and neither driving nor braking force is acting on the tires; and a decompression judging means for judging simultaneous decompression of both front wheels or simultaneous decompression of both rear wheels on the basis of only a relationship between a value obtained through comparison of the rotational information of both front wheels and the rotational information of both rear wheels and a specified threshold.

7. The method for detecting decrease in tire air-pressure according to claim 1, said steps of comparing rotational information and judging decompression are performed only when the vehicle is performing straight ahead running.

8. The apparatus for detecting decrease in tire air-pressure according to claim 2, wherein said comparing means and said decompression judging means only compare and judge when the vehicle is performing straight ahead running.

9. The apparatus for detecting decrease in tire air-pressure according to claim 3, wherein said comparing means and said decompression judging means only compare and judge when the vehicle is performing straight ahead running.

10. The method for detecting decrease in tire air-pressure according to claim 4, wherein said steps of comparing rotational information and judging simultaneous decompression are performed only when the vehicle is performing straight ahead running and no driving or braking force is acting on the tires.

11. The apparatus for detecting decrease in tire air-pressure according to claim 5, wherein said comparing means and said decompression judging means only compare and judge when the vehicle is performing straight ahead running and no driving or braking force is acting on the tires.

12. The apparatus for detecting decrease in tire air-pressure according to claim 6, wherein said comparing means and said decompression judging means only compare and judge when the vehicle is performing straight ahead running and no driving or braking force is acting on the tires.

13. The method for detecting decrease in tire air-pressure according to claim 1, wherein said comparing means and said decompression judging means only compare and judge when the vehicle is performing straight ahead running and no driving or braking force is acting on the tires.

* * * * *